(12) United States Patent
Adcook et al.

(10) Patent No.: US 8,416,071 B2
(45) Date of Patent: Apr. 9, 2013

(54) RELATIVE LOCATION DETERMINATION OF MOBILE SENSOR NODES

(75) Inventors: Scott E. Adcook, Irvine, CA (US); Carl D. Cook, La Habra, CA (US)

(73) Assignee: Raytheon Company, Waltham, MA (US)

( * ) Notice: Subject to any disclaimer, the term of this patent is extended or adjusted under 35 U.S.C. 154(b) by 846 days.

(21) Appl. No.: 12/462,365

(22) Filed: Aug. 3, 2009

(65) Prior Publication Data
US 2011/0025494 A1 Feb. 3, 2011

(51) Int. Cl.
*G08B 134/14* (2006.01)
(52) U.S. Cl. ............... 340/539.13; 340/686.1; 370/252; 701/300; 702/159
(58) Field of Classification Search ............. 340/539.13, 340/539.1, 539.22, 539.23, 540, 545.3, 686.1, 340/5.61, 10.1, 825.72; 701/23, 24, 301, 701/300; 370/252; 702/159
See application file for complete search history.

(56) References Cited

U.S. PATENT DOCUMENTS

| 6,094,169 | A | 7/2000 | Smith et al. |
| 6,720,876 | B1 | 4/2004 | Burgess |
| 2003/0061002 | A1 | 3/2003 | Steinbrecher |
| 2006/0259213 | A1* | 11/2006 | Hashimoto et al. ............ 701/23 |
| 2007/0184864 | A1* | 8/2007 | Leitch et al. ............... 455/507 |
| 2009/0207694 | A1* | 8/2009 | Guigne et al. ............... 367/127 |
| 2010/0046388 | A1* | 2/2010 | Kim et al. .................... 370/252 |
| 2011/0134781 | A1* | 6/2011 | Malnati et al. ............... 370/252 |

FOREIGN PATENT DOCUMENTS
CN 101320090 A 12/2008

OTHER PUBLICATIONS

Ahmad, et al. "Noncoherent Approach to Through-the-Wall Radar Localization", IEE Transactions on Aerospace and Electronic Systems, Vo. 42, No. 4, Oct. 2006 (pp. 1405-1419).
Marziani, et al. "Relative Positioning System Using Simultaneous Round Trip Time of Flight Measurements", IEEE, 2006 (pp. 602-605).
Written Opinion of the International Searching Authority for International Application No. PCT/US2010/044308, filed Aug. 3, 2010, Written Opinion dated Nov. 29, 2010 and mailed Dec. 9, 2010 (5 pgs.).
International Search Report for International Application No. PCT/US2010/044308, filed Aug. 3, 2010, International Search Report dated Nov. 29, 2010 and mailed Dec. 9, 2010 (4 pgs.).

* cited by examiner

*Primary Examiner* — Brent Swarthout
(74) *Attorney, Agent, or Firm* — Christie, Parker & Hale, LLP

(57) ABSTRACT

Automated sensor localization systems and methods are described. An exemplary application for the sensor localization system is in a "Sense Through the Wall" (STTW) radar system, involving a plurality of distributed sensors or sensor nodes.

14 Claims, 7 Drawing Sheets

RELATIVE LOCATION DETERMINATION OF MOBILE SENSOR NODES

This invention was made with Government support under Contract No. W15P7T-05-C-P616 awarded by the Department of the Army. The Government has certain rights in this invention.

BACKGROUND

Some detection systems such as, for example, sense through the wall radar systems, benefit from the use of distributed sensor nodes, to achieve high angle resolutions. In such a system, the accurate relative location of each sensor node is desired.

SUMMARY OF THE DISCLOSURE

A system for relative location determination of a plurality of mobile sensor nodes in a distributed sensor network is described. An exemplary embodiment of the system includes a wireless data link connecting each of the plurality of mobile sensor nodes. An ultrasonic transponder is positioned at each mobile sensor node, and includes an ultrasonic transmitter adapted to transmit ultrasonic pulses and a first receiver adapted to receive ultrasonic signals. A controller for a given sensor node is adapted to determine to measure line-of-sight distances from the given sensor node to each other sensor node using the ultrasonic pulses generated by the ultrasonic transponder for each mobile sensor node, to determine locations of the mobile sensor nodes relative to each other, and to communicate the line-of-sight distances over said wireless data link to the mobile sensor nodes.

BRIEF DESCRIPTION OF THE DRAWINGS

Features and advantages of the disclosure will readily be appreciated by persons skilled in the art from the following detailed description when read in conjunction with the drawing wherein.

DETAILED DESCRIPTION

Figure 1:
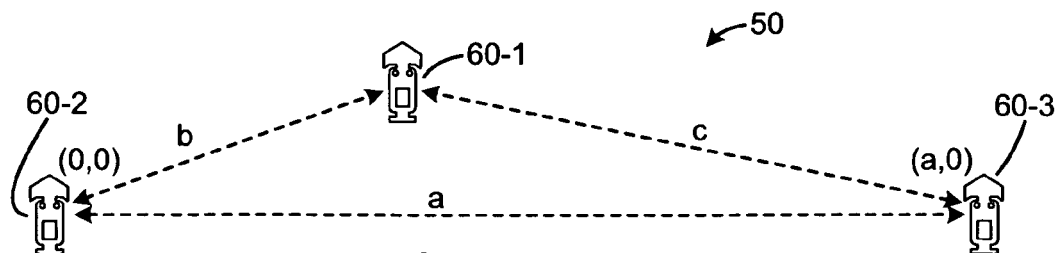
FIG. 1 diagrammatically illustrates an exemplary sensor network of distributed sensor nodes.

In the following detailed description and in the several figures of the drawing, like elements are identified with like reference numerals. The figures are not to scale, and relative feature sizes may be exaggerated for illustrative purposes.

An exemplary embodiment of an automated sensor localization system is described. An exemplary application for the sensor localization system is in a "Sense Through the Wall" (STTW) radar system, involving a plurality of distributed sensors or sensor nodes, to provide an ability to automate relative sensor location detection. However, the system may be employed in other applications as well.

In an exemplary embodiment, a plurality of mobile sensor nodes is employed in the system, with the plurality of sensor nodes forming a sensor network. FIG. 1 diagrammatically illustrates an exemplary sensor network 50, including distributed sensor nodes 60-1, 60-2 and 60-3. Each sensor node is typically associated with a sensor system which may be portable or mobile, and its position in relation to the other nodes may change as a function of time. For an STTW radar application, each sensor node may be associated with a hand-held or vehicle mounted radar sensor system forming part of a distributed aperture.

Figure 2:
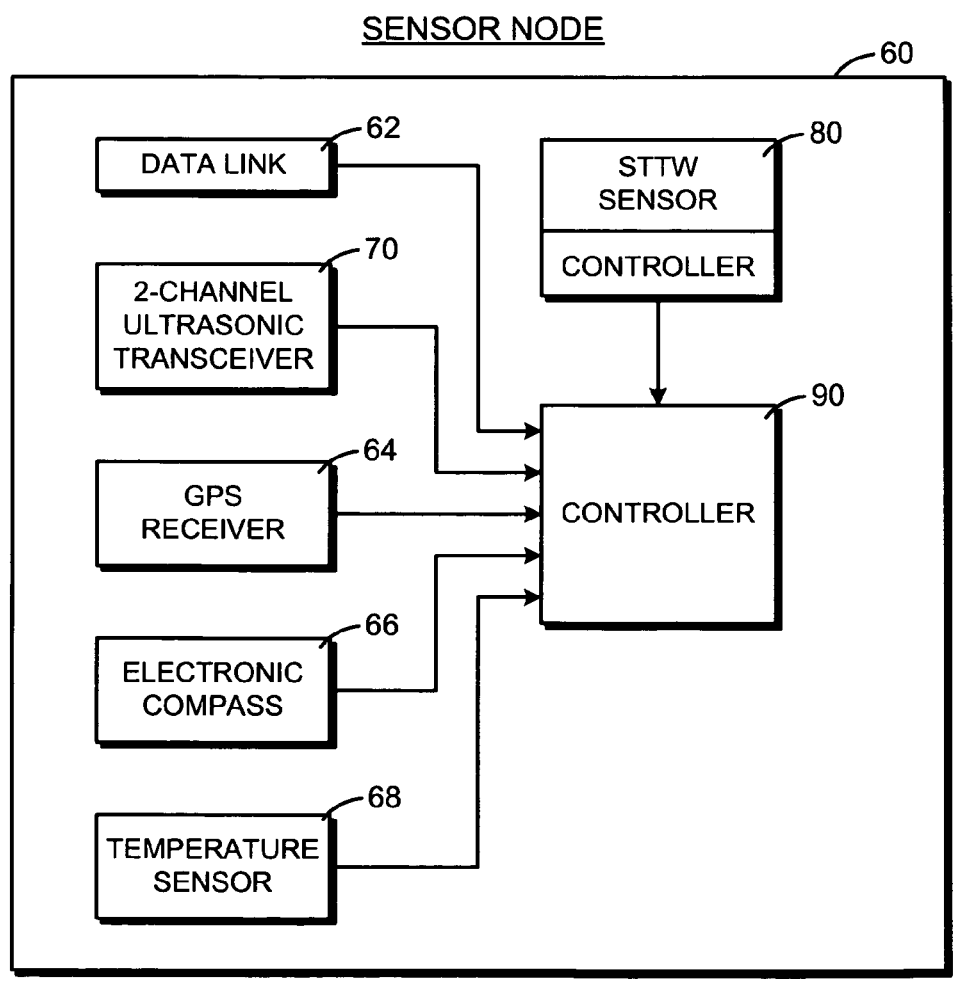
FIG. 2 is a simplified schematic block diagram of an exemplary sensor node.

For an exemplary embodiment, each sensor node may include a low bandwidth wireless data link, a 2-channel ultrasonic transceiver, a standard GPS receiver, and an electronic compass. FIG. 2 is a simplified schematic block diagram of an exemplary sensor node 60, which includes the data link 62, a GPS receiver 64, an electronic compass 66 and a temperature sensor 68. In an exemplary embodiment, the wireless data link may employ a standard TCP/IP interface on the sensor node, connected to an external radio, such as, by way of example only, a Raytheon MicroLight™ radio.

Each sensor node also includes a two channel ultrasonic transceiver 70 (described further with respect to FIG. 3), the associated STTW sensor 80 and a controller 90. The controller may include a microprocessor or an ASIC, for example, to control operations of the sensor node. GPS coordinates provided by the GPS receiver may be used by the sensor data network to automate ad-hoc networking between nearby sensors, i.e. sensors located nearby each other such that they are candidates for forming a cooperative network. In an exemplary application, for example, the sensors located within 15 meters or so of each other may be networked.

Figure 3:
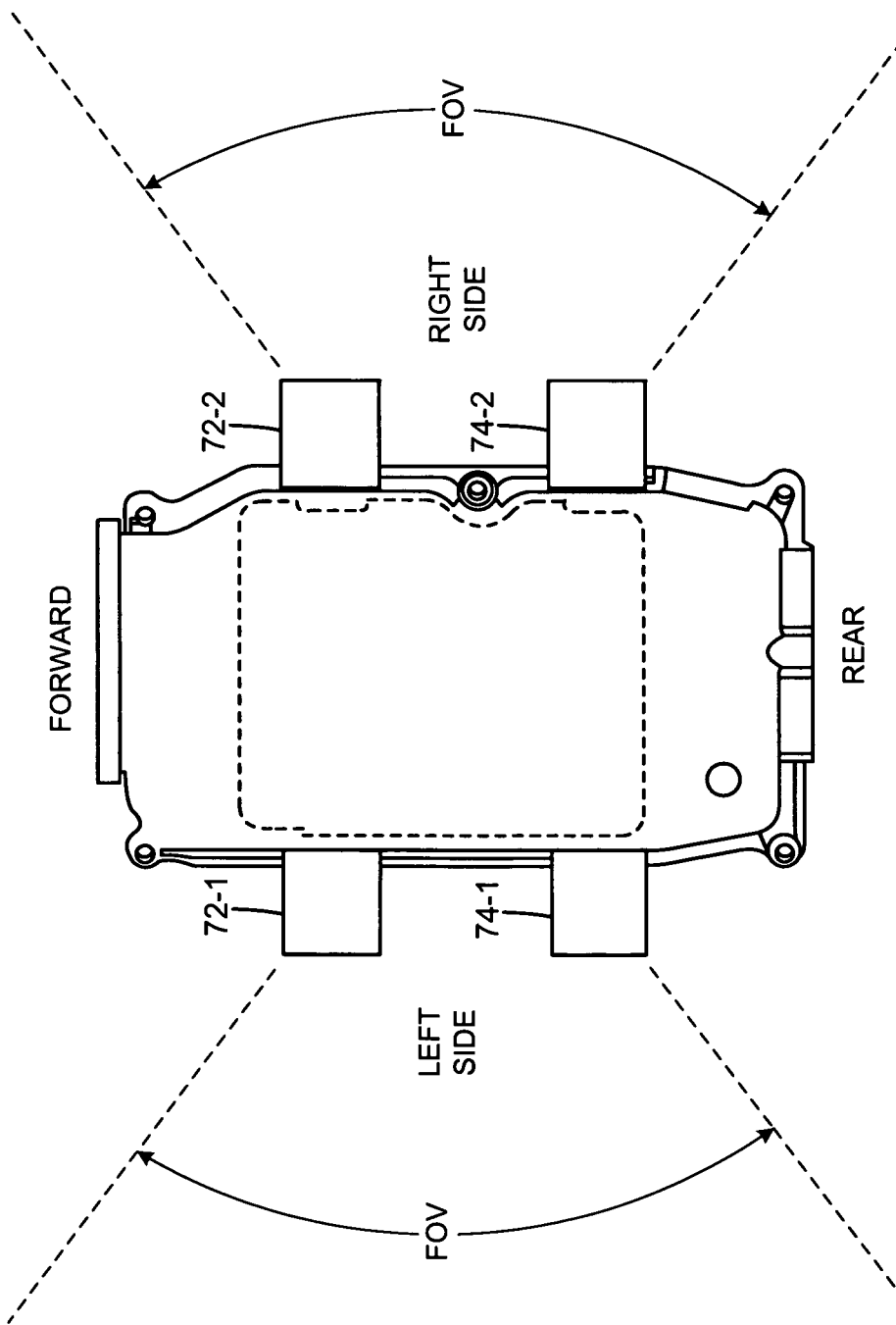
FIG. 3 is a schematic illustration of a two channel ultrasonic transponder.

FIG. 3 is a schematic illustration of a layout for a two channel ultrasonic transponder 70. The transponder includes a left side transponder channel including an ultrasonic transmitter 72-1 and an ultrasonic receiver 74-1. The transponder also includes a right side transponder channel including an ultrasonic transmitter 74-1 and an ultrasonic receiver 74-2.

In an exemplary embodiment, reliable and accurate ranging between co-located sensor nodes (e.g., accuracy to less than 5 cm over a 15 meter range in an exemplary embodiment) may be achieved using a cooperative (transmit, receive, delay, and echo back) ultrasonic ranging protocol between sensor nodes in the network 50. In the exemplary embodiment in which each sensor node includes a radar sensor system forming part of a distributed aperture for a radar system such as an STTW radar, the angle ambiguity between sensors may be resolved by processing the STTW radar sensor data (locally at each node) using a non-coherent multi-lateration algorithm that outputs solutions for each of the possible angle solutions (i.e. for three nodes in a two dimensional sensor layout there are two possible solutions to track). Only one relative angle solution will result in converged target tracks from the distributed radar network, thus resolving the relative sensor location solution.

For purposes of the exemplary embodiment of a location system described below, it will be assumed that a wireless sensor network has been established. Algorithms for automatically establishing an ad-hoc wireless sensor network between co-located sensors are not described herein. GPS data, where available, may be used to facilitate this automation. It is assumed, for an exemplary STTW application, that a local network of at least two STTW sensors has been established either automatically or manually. Under this assumption, an exemplary technique to automatically determine the relative locations of those sensors is described. The exemplary description of the technique is directed to a typical three sensor node network as shown in FIG. 1. However, the same techniques may be applied to networks with only two or several nodes.

An exemplary embodiment of a technique to determine the relative locations of the sensors 60-1, 60-2, 60-3 (FIG. 1) makes use of cooperative ultrasonic ranging techniques to measure the line-of-sight distance between each of the sensors in a local network. Each sensor node may be equipped with a two channel ultrasonic transponder (transmitter and receiver) 70. One channel (transmitter 72-1 and receiver 74-1, FIG. 3) is oriented to transmit and receive ultrasonic signals to the left of the sensor node over at least a 60 degree azimuth field of view (FOV), and a second channel (transmitter 72-2 and receiver 74-2, FIG. 3) is oriented for transmit/receive operation on the right side of the sensor over at least a 60 degree FOV. In an exemplary embodiment, the ultrasonic transponders may operate at frequencies from 20 KHz to 80 KHz; a frequency of operation of 60 KHz may be suitable for an exemplary STTW application.

The three sensor nodes may be configured or positioned by the users into an obtuse triangle as shown in FIG. 1. One node may be designated as a "master" node, either manually by a user or automatically by the local wireless sensor network. Upon initiation when the STTW system requires a sensor localization solution, the "master" node transmits an ultrasonic pulse that initiates a series of back and forth ultrasonic transmissions among each of the sensor nodes that may be repeated until a measurement time interval has elapsed.

By measuring the times for the ultrasonic signal to travel from one node to another, and then back again, the transponders can measure the distances between each of the nodes. This distance information calculated at each node may then be distributed by the network using wireless data link 62 to each of the other sensor nodes in the system, such that each sensor node has knowledge of distances a, b, and c (FIG. 1). The sensor node measures a time delay. However, in this exemplary embodiment, it is not the delay for a reflected signal from the remote transceiver, which would generally be too weak to detect. Upon detecting an ultrasonic pulse, each receiver adds a specific time delay and then transmits its own new pulse back towards the original transmitter. The original transmitter subtracts the known delay added by the remote transceiver, and can then calculate the round trip time that the pulse traveled through the air, thus deriving a distance. It is a cooperative distance measurement between two ultrasonic transceivers rather than relying on reflected ultrasonic energy, which would be quite unreliable in an exemplary outdoor application over the 15 m distances of interest.

The speed of sound used in the distance determination is calculated (by the controller 90) from the temperature probe reading (T) using the formula:

$$c(T) = 331.318\sqrt{1 + \frac{T}{273}}$$

The following is an example of one sequence of steps that the three nodes 60-1, 60-2, 60-3 may take to measure the distances a, b, and c, and to identify which transponder is at node 60-2 and which transponder is at node 60-3. Other similar protocols can be utilized to accomplish the same task.

1. The master sensor node broadcasts a notification over the data link that an ultrasonic ranging measurement is being initiated. This command is used to enable the receivers in each of the other nodes in the network.

2. T1L (left side transmitter at node 60-1) transmits an ultrasonic pulse. In an exemplary embodiment, the nodes communicate with each other using seven cycle 61 kHz acoustic pulses. Each transmission consists of multiple pulses. Pulse position modulation, or coding, is used to uniquely associate a given transmission with a sensor node. This coding is also has the benefit of improving noise immunity. Other coding techniques could alternatively be used.

3. R2R (right side receiver at node 60-2) receives the transmission (by receiving a transmission from T1L on its right side, node 60-2 assumes the identity as node 60-2).

4. T2R (right side transmitter at node 60-2) transmits a series of ultrasonic pulses after a fixed delay $\Delta\tau 1$. This time delay and the other time delays described below are known to all nodes a priori;

5. R1L (left side receiver at node 60-1) receives the reply transmission from T2R and sensor 60-1 calculates distance b. The distance is calculated, in an exemplary embodiment, as ((Time from T1L transmit to R1L receive)$-\Delta\tau 1$)*(speed of sound).

6. R3L (left side receiver at node 60-3) also receives the reply transmission from T2R in step 3 (by receiving on left side, it identifies itself as node 60-3);

7. T3L (left side transmitter at node 60-3) transmits after fixed delay $\Delta\tau 2$;

8. R2R receives reply transmission from T3L, and sensor 60-2 determines distance a;

9. R1R (right side receiver at node 60-1) also receives reply transmission from T3L in step 6;

10. T1R (right side transmitter at node 60-1) transmits after delay $\Delta\tau 3$;

11. R3L receives reply transmission from T1R, and sensor 60-3 determines distance c;

12. Steps 1 through 11 are repeated as many times as possible until the maximum specified measurement time has been reached, except ultrasonic transponders at Nodes 60-2 and 60-3 now know they are Nodes 2 and 3, so they only "listen" on their right or left sides respectively.

13. After the measurement time has elapsed, the multiple distance measurements for a, b, and c are averaged. Each node then communicates to the others the average distances that it has measured. Thus, in an exemplary embodiment, after the measurement cycle is complete, each sensor node sends out a packet of information on the data link that includes its identification (ID) and whichever distance the node calculated based on the ranging measurements it made (a to b, a to c, or b to c depending on the node).

Given a distance measurement between each of three sensor nodes, the relative locations of each sensor may be calculated by solving for a triangle with sides a, b, and c (or multiple triangles for a network of greater than three nodes). Selecting vertices (0,0), (a,0), and (x,y) and solving $$x^2 + y^2 = b^2$$

$$(x-a)^2 + y^2 = c^2$$

one can obtain, $$x = \frac{a^2 + b^2 - c^2}{2a}$$

$$y = \pm \frac{\sqrt{(-a+b+c)(a-b+c)(a+b-c)(a+b+c)}}{2a}$$

The angle between the sensors is not uniquely determined by measuring the distances between each node. For the three node case, the solution for vertices (x,y) includes two possible locations (one the mirror image of the other across the y=0 axis). An ultrasonic angle of arrival technique may be employed to resolve the angle ambiguity, at the expense of additional hardware size and complexity.

An alternate approach may be employed to resolve this angle ambiguity in the sensor network and fully resolve the sensor localization problem. To reduce the amount of required wireless network bandwidth of data link 62, a moving target detection technique based on hyperbolic tri-lateration algorithms may be used. To resolve the sensor localization problem the radar data processor tracks multiple simultaneous tri-lateration solutions for each of the possible angle configurations (two configurations for the three node case). The incorrect angle assumption does not yield any converged target tracks from the radar network. The correct angle assumption will result in converged target tracks from the radar network when targets are present. The convergence of a target track from the multiple simultaneous tri-lateration solution is the event that resolves the sensor localization ambiguity and the additional processing paths are then dropped.

Figure 4:
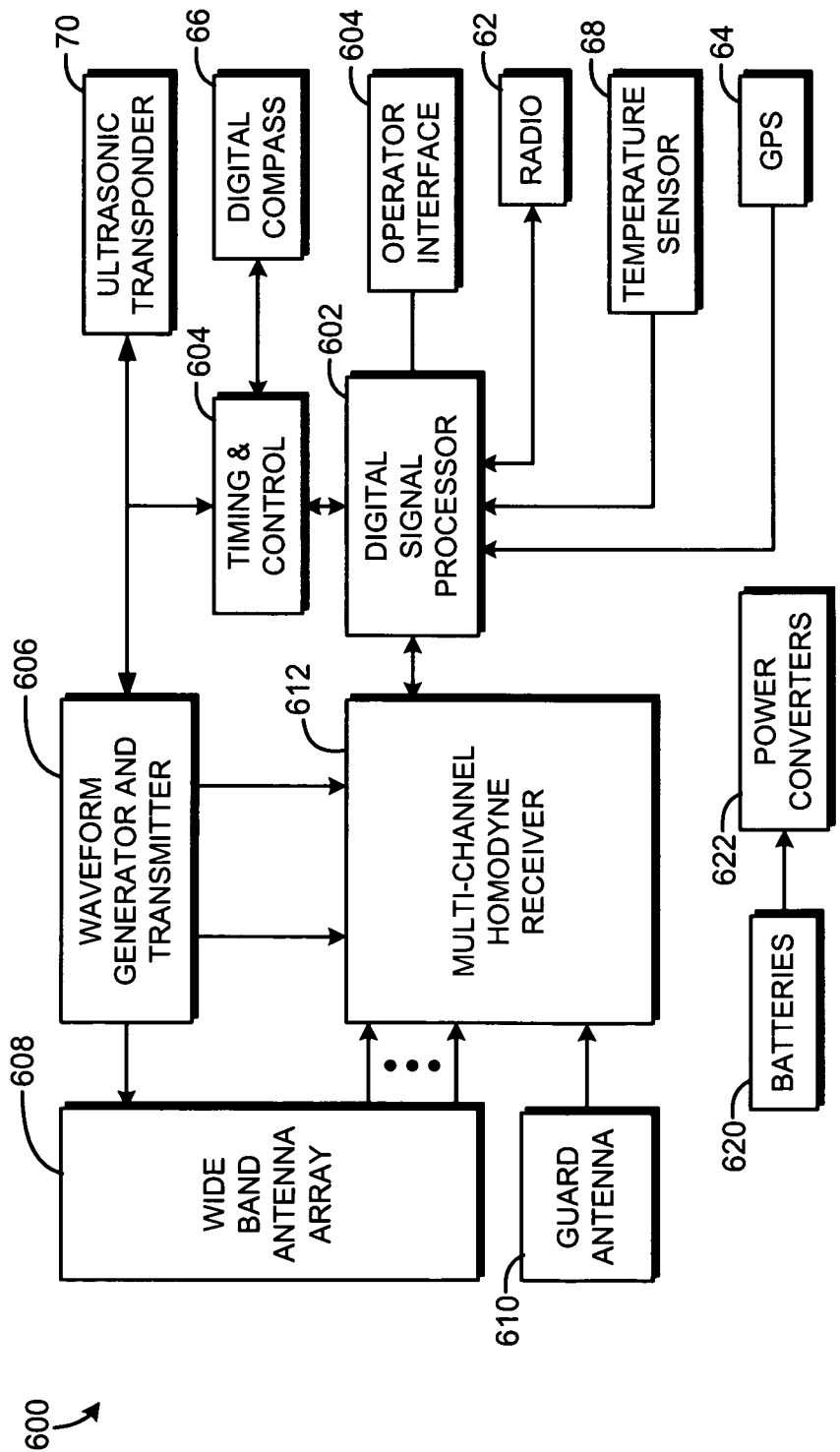
FIG. 4 is a schematic block diagram of an exemplary embodiment of a sensor node.

An exemplary embodiment of a sensor node and flow diagrams for determining relative locations of the sensor node in a network of nodes is illustrated in FIGS. 4 and 5A-5D. FIG. 4 is a schematic block diagram of elements of the sensor node 600. As with the embodiment of FIG. 2, the node 600 includes a data link provided by radio 62, a GPS receiver 64, a digital compass 66 and a temperature sensor 68. An SSTW sensor (corresponding to sensor 80 depicted in FIG. 2) is illustrated in further detail in FIG. 4, and includes a radar data processor 602 such as a digital signal processor (DSP), timing and control module 604 and a radar waveform generator and transmitter 606. The transmitter signals are provided to a wideband antenna array 608, which is also connected to a multi-channel receiver 612. A guard antenna 610 is connected to the receiver as well. Electrical power for the sensor node is provided in this embodiment by standard AA batteries 620 and DC-DC power converters 622.

Figure 5A:
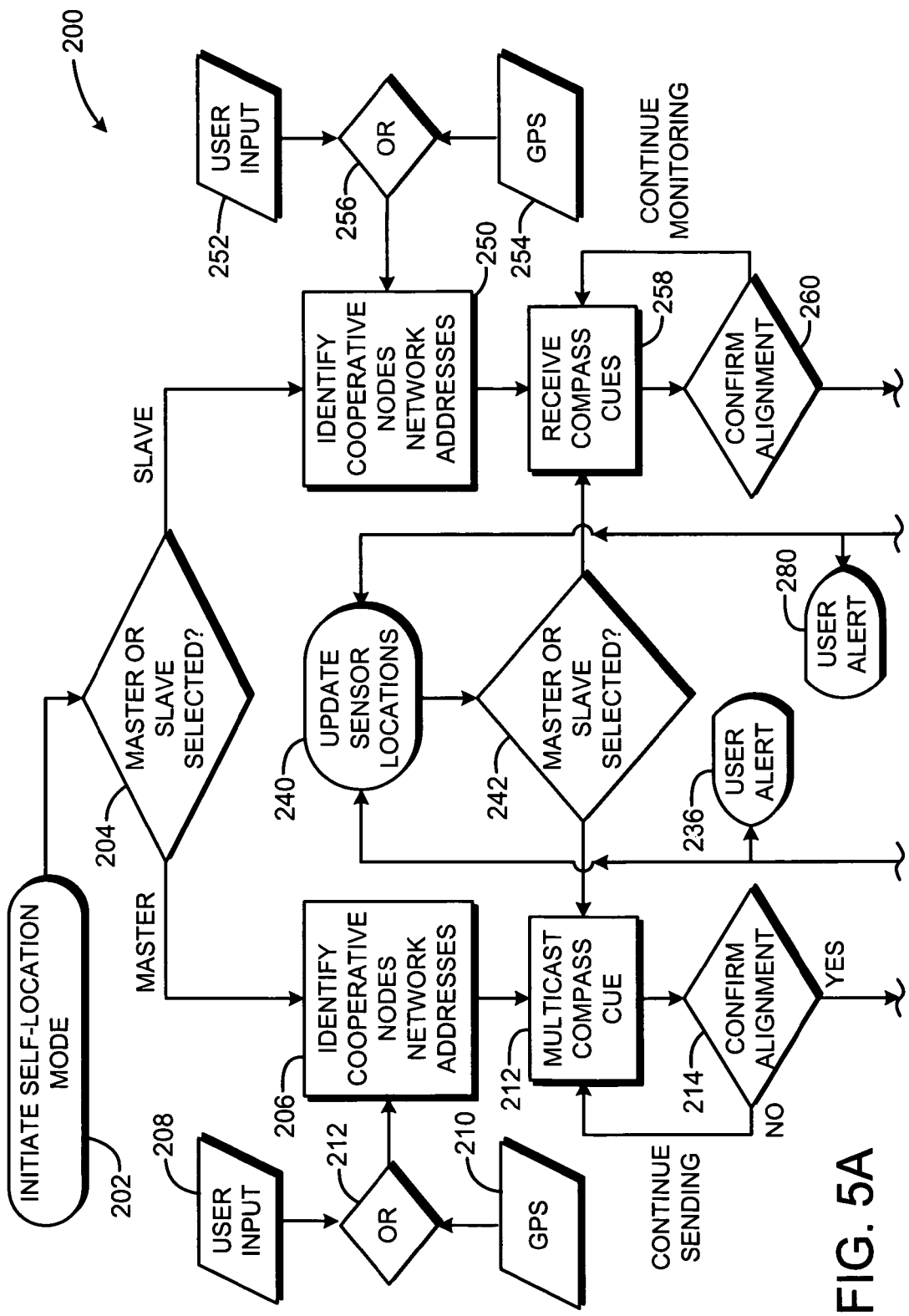
FIGS. 5A-5B are flow diagrams illustrating an exemplary method for sensor location in a network of distributed sensor nodes.
Figure 5B:
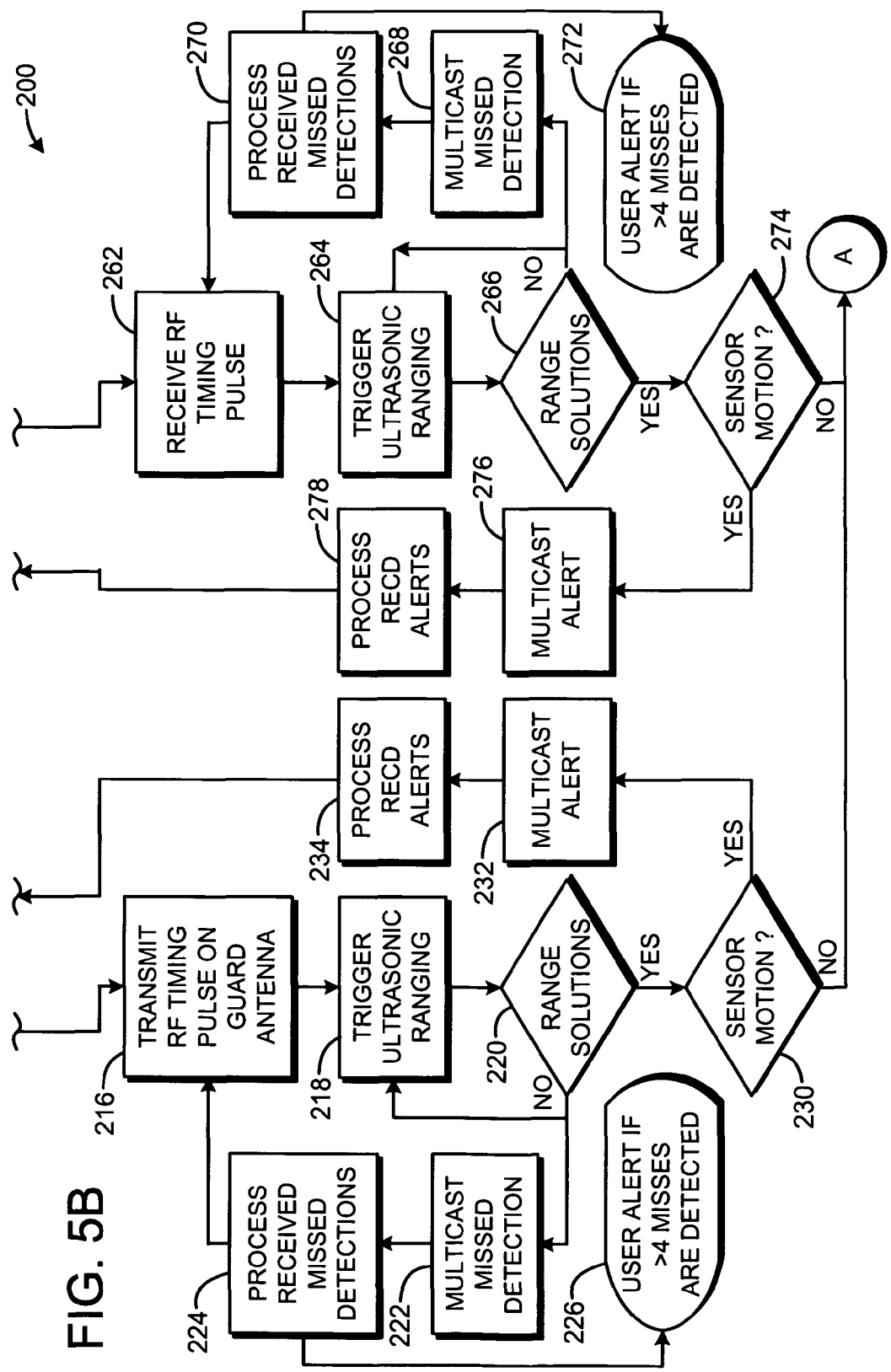

FIGS. 5A-5B are flow diagrams illustrating an exemplary method 200 for sensor location in a network of distributed sensor nodes. Each sensor node may be a node as illustrated in FIG. 4, for example, which includes an STTW sensor. A given cooperative sensor network includes a single "master" designated node and two or more "slave" designated nodes, in this example: The master node sets the heading reference for the target area of the STTW sensor. Each slave node operator is cued to align the respective node sensor to the target area designated by the master, i.e. to the designated heading. The sensor relative location measurement proceeds from 202. At 204, the operation of a given node is dependent on whether the node is a master or a slave node. If a master node, then at 206, 208, 210 and 212 the nodes in the network are determined, either (212) by user input (208) or by GPS location of nodes in the area (210). At 212, the master node sends out signals to the slave nodes with a heading to which the master and slave nodes are to be pointed. Once alignment has been confirmed (214) by the slave nodes sending confirmations using the data link that the slave nodes are pointed to the instructed heading, the master node transmits an RF timing pulse using its guard antenna 619 (FIG. 4). The timing pulse triggers the ultrasonic ranging process described above. At 220, the master node determines whether the ranging process has resulted in a valid range solution. If not, failures are broadcast and received at each node (222 and 224), and the ranging process is repeated. At there are multiple failures to detect valid ranges or if invalid responses are still received, then the user will be alerted that the process has failed (226).

Figure 6A:
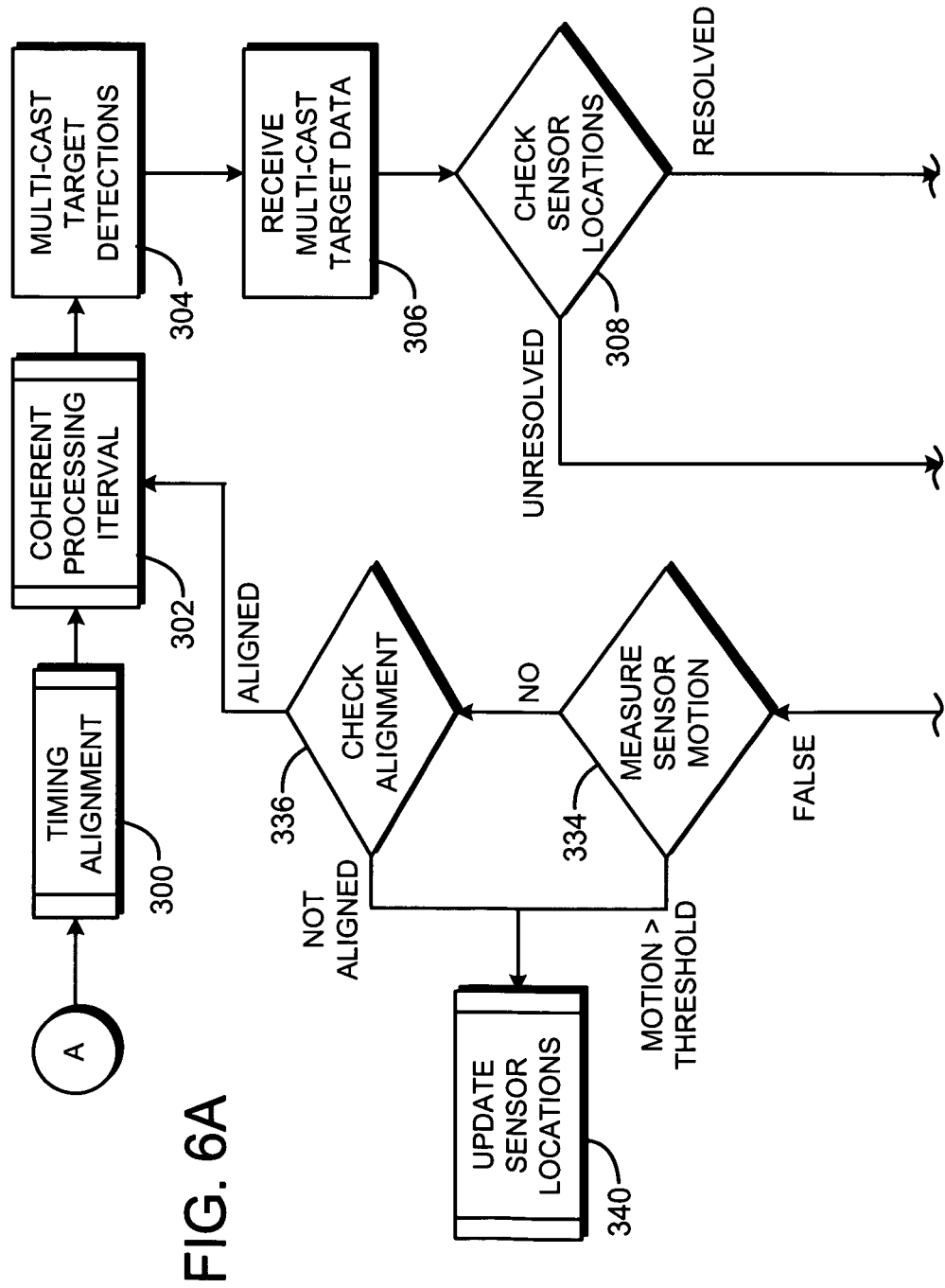
FIGS. 6A-6B illustrate an exemplary flow diagram of a processing interval for a radar system implemented by an exemplary network of network of sensors, using location information provided by an ultrasonic ranging process.

Once range solutions have been calculated (220), each node in the network monitors (230) whether the sensor is subject to motion that would invalidate the ranging solution. If the sensors remain stationary, then operation proceed to A, at FIG. 6A, showing an exemplary operating interval of the STTW radar. If sensor motion has been detected at any one or more of the sensor nodes, then an alert is multicast, using the data link, at 232, received alerts from each node are processed at 234, a user alert in the form of a message on the graphical user interface (GUI) is issued at 236, and operation proceeds to 240 and 242 to determine updated sensor locations.

Returning to step 204 (FIG. 5A), if the sensor node is a slave node, then steps analogous to those described above regarding a master node are undertaken at 250-278.

Figure 6B:
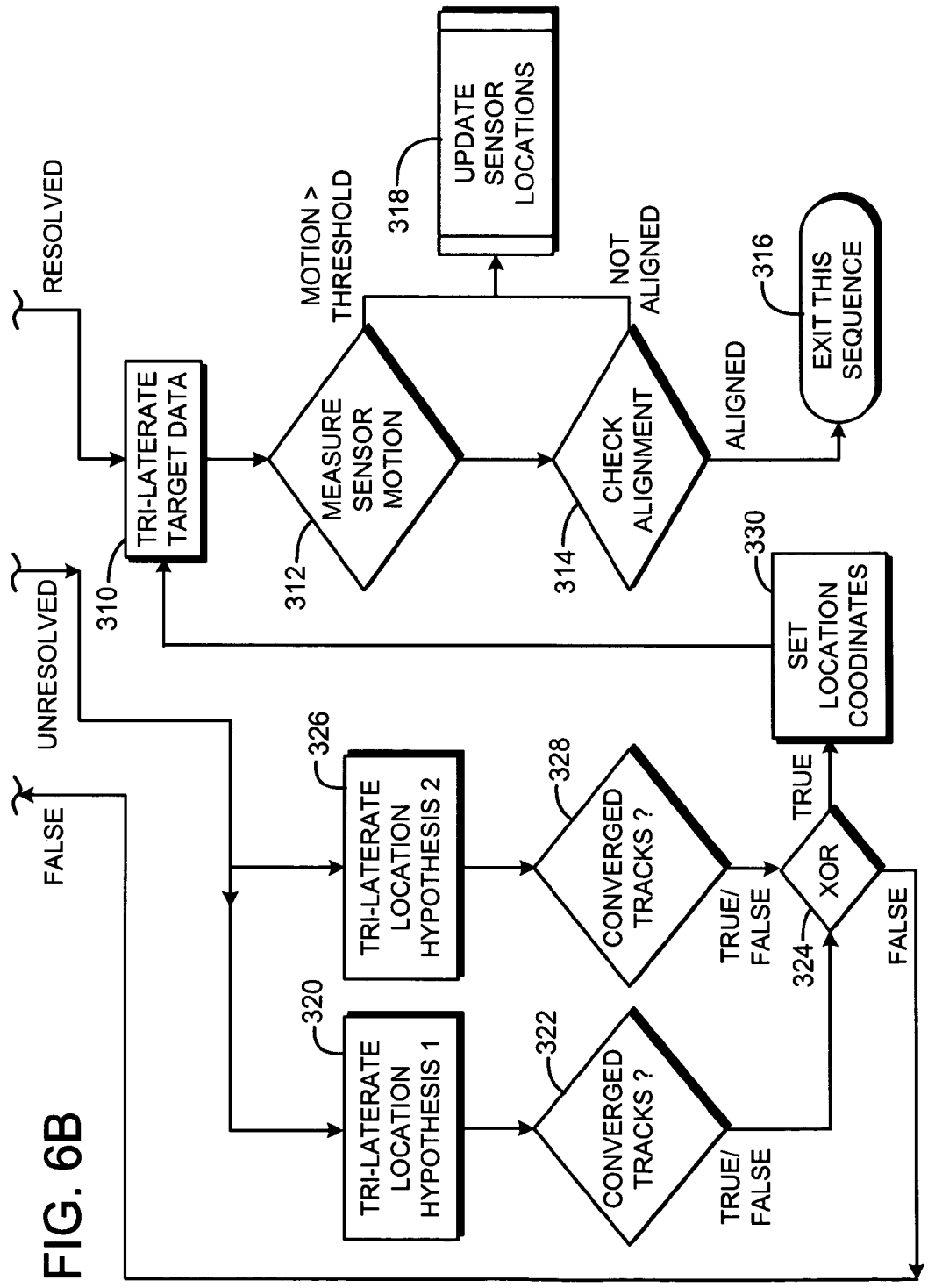

FIGS. 6A-6B illustrate an exemplary flow diagram of a processing interval for the STTW radar implemented by an exemplary network of network of sensors, using the location information provided by the ultrasonic ranging process conducted as described above. Step 300 represents timing alignment. In an exemplary embodiment, this step sets all the sensor nodes to the same timing, so that for different modes, transmit and receive operations by the different sensor nodes may be conducted in a time interleaved fashion. Step 302 represents a coherent processing interval, which in an exemplary embodiment has a duration of 320 microseconds. At 304 and 306, the target detection data from the respective sensor nodes in the network are multi-cast to the network nodes over the data link. At 308, the sensor locations are checked, to determine if the angles between the sensors have been resolved. The first time through step 308, the angles will be unresolved, and in this case operation proceeds to 320, 326, where first and second location hypotheses are developed. Using the respective hypotheses, the radar data are processed for converged tracks. Only one hypothesis should result in a converged track, and if that is the case, at 324, the relative location coordinates of the sensors are set at 330, and operation proceeds to 310 to tri-laterate the target data. At 312, each sensor verifies that it has remained sufficiently stationary. If sensor movement exceeds a threshold, operation branches to 318 to update the sensor locations. This may be accomplished by returning to step 240 (FIG. 5A). Similarly, if the sensors are not aligned at 314, operation branches to 318 to update the sensor locations. If sensor movement has not exceeded the threshold, and the sensors are aligned, the sequence is exited at 316.

An exemplary embodiment of this location system may include a low bandwidth data network, and cooperative ultrasonic transceivers for reliable and accurate ranging between nodes. The exemplary embodiment may further include GPS receivers to facilitate automatic ad-hoc networks of collocated STTW sensor nodes. Techniques such as ultrasonic angle of arrival techniques or non-coherent multi-lateration processing utilizing radar returns from STTW sensors deployed at each node may be employed to resolve angle ambiguities between sensors.

In an exemplary embodiment, each radar sensor node computes a range and angle to detected personnel targets through walls using a tri-lateration algorithm, where the distances between sensor nodes is determined using an ultrasonic ranging process, and the angle ambiguity between sensors is resolved by monitoring two tri-lateration solutions for the targets detected by the multi-node radar sensor network and waiting for the correct sensor location hypothesis to yield converged target tracks.

Although the foregoing has been a description and illustration of specific embodiments of the invention, various modifications and changes thereto can be made by persons skilled in the art without departing from the scope and spirit of the invention as defined by the following claims.

What is claimed is:

1. A system for relative location determination of a plurality of mobile sensor nodes in a distributed sensor network, comprising:
a wireless data link connecting each of said plurality of mobile sensor nodes;
an ultrasonic transponder positioned at each mobile sensor node, said transponder including an ultrasonic transmitter adapted to transmit ultrasonic pulses and a first receiver adapted to receive ultrasonic signals; and
a controller for each sensor node, wherein the controller for a given sensor node is adapted to determine line-of-sight distances from the given sensor node to each other sensor node using the ultrasonic pulses generated by the ultrasonic transponder for each mobile sensor node, to determine locations of the mobile sensor nodes relative to each other, and to communicate said line-of-sight distances over said wireless data link to the mobile sensor nodes, wherein each mobile sensor node further comprises a radar sensor, and wherein the radar sensor includes a radar data processor configured to track multiple simultaneous tri-lateration target solutions for each possible relative angular position assumption for the mobile sensors in the network, and to select the angular position assumption which yields a converged target track.

2. The system of claim 1, wherein said ultrasonic transponders are configured to operate at a frequency in a range from 20 KHz to 80 KHz.

3. The system of claim 1, wherein said ultrasonic transponders are configured to operate at about 60 KHz.

4. The system of claim 1, further comprising a temperature sensor at each mobile sensor node for generating a temperature signal indicative of an ambient temperature at the mobile node, and said controller is configured to determine a speed of sound propagation of ultrasonic pulses generated by the ultrasonic transponder in dependence on said ambient temperature signal.

5. The system of claim 1, wherein the radar sensor is a sense through the wall radar sensor, and the radar sensor includes a radar data processor configured to detect and track a range to through wall targets and communicates target range data to each of the other sensor nodes over said wireless data link.

6. A system for relative location determination of a plurality of mobile sensor nodes in a distributed sensor network, comprising:
a wireless data link connecting each of said plurality of mobile sensor nodes;
an ultrasonic transponder positioned at each mobile sensor node, said transponder including an ultrasonic transmitter adapted to transmit ultrasonic pulses and a first receiver adapted to receive ultrasonic signals; and
a controller for each sensor node, wherein the controller for a given sensor node is adapted to determine line-of-sight distances from the given sensor node to each other sensor node using the ultrasonic pulses generated by the ultrasonic transponder for each mobile sensor node, to determine locations of the mobile sensor nodes relative to each other, and to communicate said line-of-sight distances over said wireless data link to the mobile sensor nodes, wherein each mobile sensor node further comprises a radar sensor, wherein the radar sensor is a sense through the wall radar sensor, and the radar sensor includes a radar data processor configured to detect and track a range to through wall targets and communicates target range data to each of the other sensor nodes over said wireless data link and, wherein each sensor node receives said target range data from other nodes and is configured to compute multiple simultaneous tri-lateration solutions for a plurality of possible relative angular position assumptions for the mobile sensor nodes in the network, and to select an angular position assumption corresponding to a tri-lateration solution with converged target tracks.

7. The system of claim 6, wherein said two-channel transponders are configured to operate at a frequency in a range from 20 KHz to 80 KHz.

8. The system of claim 6, wherein said two-channel transponders are configured to operate at about 60 KHz.

9. The system of claim 6, wherein each mobile sensor node has a front side, a back side, a left side and a right side, and wherein said first direction is toward said left side, and said second direction is toward said right side.

10. The system of claim 6, wherein said azimuth field of view is at least a 60 degree field of view.

11. The system of claim 6, further comprising a temperature sensor at each mobile sensor node for generating a temperature signal indicative of an ambient temperature at the mobile node, and said processor is configured to determine a speed of sound propagation of ultrasonic pulses generated by the ultrasonic transponder in dependence on said ambient temperature signal.

12. The system of claim 6, wherein each mobile sensor node further comprises a radar sensor.

13. A system for relative location determination of a plurality of mobile sensor nodes in a distributed sensor network, comprising:
a wireless data link connecting each of said plurality of mobile sensor nodes;
a two channel ultrasonic transponder positioned at each mobile sensor node, said transponder including a first channel comprising a first transmitter and a first receiver oriented to transmit and receive ultrasonic signals toward a first direction relative to the sensor node over an azimuth field of view, and a second channel comprising a second transmitter and a second receiver oriented to transmit and receive ultrasonic signals toward a second direction relative to the sensor node over an azimuth field of view; and
a controller adapted to determine line-of-sight distances between each of the mobile sensor nodes using ultrasonic pulses generated by the two-channel transponders for each mobile sensor node, to determine locations of the mobile nodes relative to each other, and to communicate said line-of-sight distances over said wireless data link to the mobile sensor nodes, wherein each mobile sensor node further comprises a radar sensor and wherein the radar sensor includes a radar data processor configured to track multiple simultaneous tri-lateration solutions for each possible relative angular position assumption for the mobile sensors in the network, and to select the angular position assumption which yields a converged target track.

14. A method for determining relative locations of three mobile sensor nodes with their relative positions defining a triangle with side lengths a, b, and c in a distributed sensor network, the method comprising:
activating respective ultrasonic transponder systems at each of the mobile sensor nodes to transmit sequences of ultrasonic pulses from one mobile sensor node and receive the ultrasonic pulses at others of the mobile sensor nodes to determine respective line-of-sight distance measurements of side lengths a, b and c;

communicating said distance measurements from each mobile sensor node to all other sensor nodes over a wireless data link; and using said distance measurements between each of the three sensor nodes, calculating the relative locations of each mobile sensor node, wherein each mobile sensor node further comprises a radar sensor including a radar data processor, the method further comprising:

tracking multiple simultaneous tri-lateration solutions for each possible relative angular position assumption for the mobile sensors in the network; and selecting the angular position assumption which yields a converged target track to resolve ambiguities in the relative location of the mobile sensor nodes.

\* \* \* \* \*